March 11, 1969 M. J. ZOLA 3,432,688
SENSE AMPLIFIER FOR MEMORY SYSTEM
Filed Dec. 21, 1965
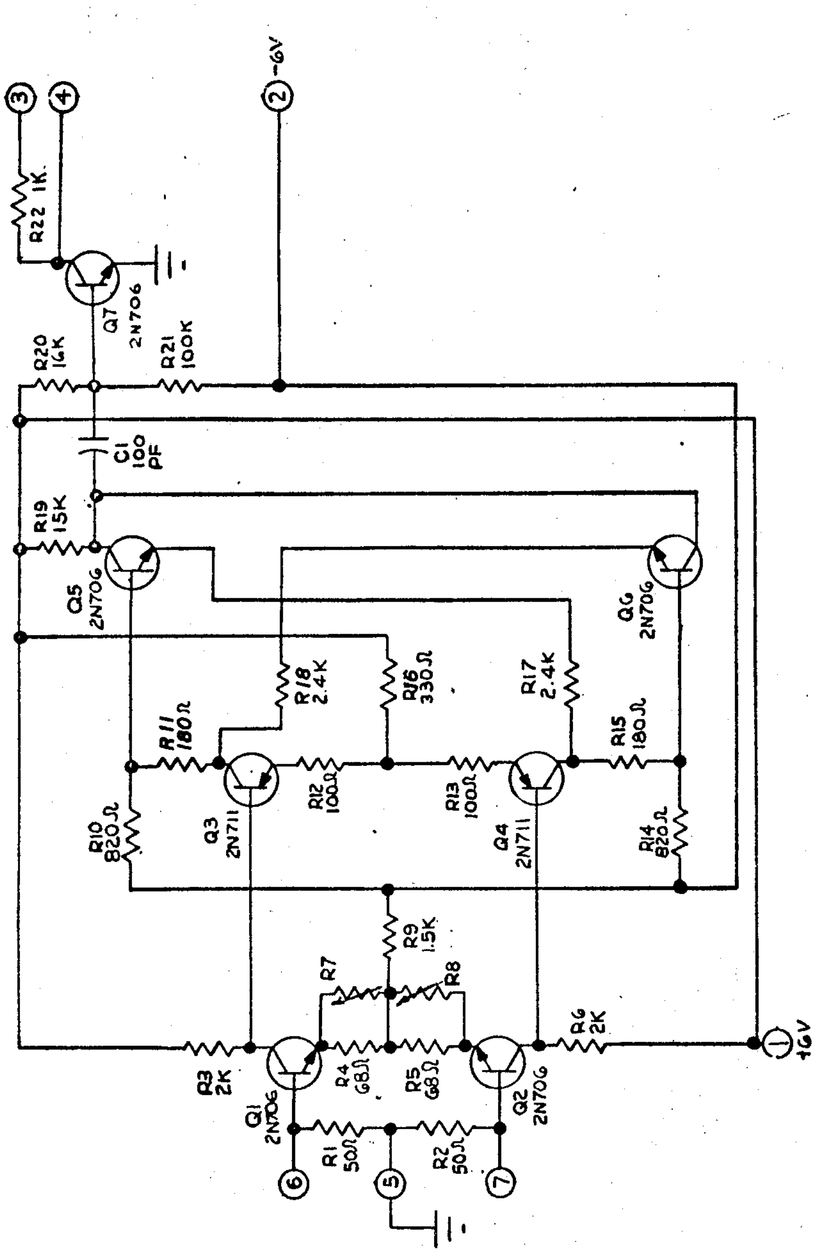
INVENTOR.
MEYER J. ZOLA
BY
AGENT United States Patent Office 3,432,688

Patented Mar. 11, 1969

3,432,688

SENSE AMPLIFIER FOR MEMORY SYSTEM

Meyer J. Zola, New Paltz, N.Y., assignor to Ferroxcube Corporation of America, Saugerties, N.Y., a corporation of Delaware Filed Dec. 21, 1965, Ser. No. 515,421

U.S. Cl. 307—239 11 Claims

Int. Cl. H03k *17/00, 5/08*

ABSTRACT OF THE DISCLOSURE

A sense amplifier for amplifying low level signals and having first and second differential amplifier stages with mutually complementary transistors and a rectifier stage having its input connected directly across the differential output of the second differential amplifier stage.

This invention relates to an amplifier and particularly to a sense amplifier for computer matrix memory systems.

In many computer matrix memory systems using bit storage devices such as magnetic cores or the like, information storage and readout is accomplished by coincident current selection involving the well known use of coincidence between two half select currents in the particular core being selected. Due to the profusion of partial select currents remaining throughout the nonselected cores, as well as the effects of transient pulses, stray capacitance, and other loading effects, a high noise content is present.

The output current induced by a selected core of a particular magnetic core array will not usually be of sufficient magnitude to generate a voltage capable of effecting logical operations in other segments of the computer. An output amplifier must therefore be employed to sense the presence or absence of a selected bit of information read out of the memory matrix and in so doing, step up the voltage level of the sensed bit to system logic levels. The sense amplifier is the most critical circuit of a memory system due to the conflicting requirements of high gain, necessary voltage swing, stability, bandwidth, common mode rejection, low cost, and other factors needed to amplify a low level signal up to logic levels in the presence of large noise signals. Further difficulties arise in present sense amplifiers wherein a plurality of inductive and capacitive coupling elements serve to limit the response time of the amplifier in higher speed readout systems because of the time required for these elements to recover their quiescent state between successive input signals. If sucessive input signals appear within a period of time less than that required for quiescent recovery of the nonlinear elements, the total signal swing available becomes correspondingly reduced. Although the quiescent recovery time problem can be somewhat ameliorated in the design of a sense amplifier by eliminating A.C. components, it is highly impractical to achieve adequate stability at the required gain because of drifts arising from the component and temperature changes affecting the DC components.

It is therefore a primary object of the present invention to provide a stable, high gain sense amplifier.

It is another object of the present invention to provide a multistage amplifier wherein each stage operates with maximum swing in its linear region.

It is a further object of the present invention to provide a sense amplifier with an effectively high signal to noise discrimination.

It is a still further object of the present invention to provide a sense amplifier with minimal reactive coupling elements, thereby raising the amplifier capability for high speed successive read out while maintaining environmental stability.

It is an object of the present invention to provide a simple, effective, economical, and packageable amplifier for use in sensing the output of a memory storage matrix.

One of the limiting factors in low level detection of DC signal is the error resultant due to drift. Drift, the resultant effect due to the changing of circuit parameters by temperature and life, is quantitatively definable as that amount of input signal necessary to return the amplifier output signal to its original quiescent level. In high gain amplifiers, feedback is ineffective in reducing drift due to its deleterious effect on gain. One of the more effective methods of compensating for drift, without reducing gain, is found in the differential amplifier circuit. The common mode rejection feature of the differential amplifier, in the arrangement of the present invention, serves to effectively single out and amplify the sensed information signals in the presence of noise and large common mode signals.

In carrying out the invention, an information signal sensed in the memory is introduced in bipolar form to a first transistorized emitter coupled differential amplifier. The bipolar signals are amplified and each appears at its respective transistor collector. From there the bipolar signals are introduced to a second transistorized emitter coupled differential amplifier comprising a pair of transistors of opposite conductivity type relative to the first stage transistors. By using opposite conductivity type transistors, D.C. level buildup between the first and second sages is eliminated. The resultant signals, still in bipolar form, are introduced to a threshold controlled rectifier and strobed for use in subsequent logic circuits. Normally a rectifier is referenced from one output to ground, however the rectifier in accordance with the present invention will have true differential rectification with signals taken across the entire differential output of the second differential stage. This serves to increase gain and stability and common mode rejection factors.

Further objects and advantages will become apparent and be more fully understood from the following exemplary explanation.

FIG. 1 is an embodiment of a sense amplifier employing mutually complementary transistor differential amplifiers.

In the embodiment shown, a positive potential is applied through terminal point 1, a negative potential through terminal point 2, and a strobe pulse through terminal point 3, which results in an output pulse at terminal point 4 in the presence of sensed information as will be described in further detail below. Terminal point 5 is referenced to ground. Relatively low level bipolar input signals are applied to terminals 6 and 7 respectively across base bias resistances $R_1$ and $R_2$, referenced to ground, wherein proper base biasing current is provided for a first differential amplifier comprising first and second NPN transistors $Q_1$ and $Q_2$. The collector of $Q_1$ is coupled to positive potential through a resistance $R_3$, the emitters of $Q_1$ and $Q_2$ are coupled together through the coupling resistances $R_4$ and $R_5$, while the collector of $Q_2$ is returned to positive potential through the resistance $R_6$ thus completing the loop. Resistances 7 and 8 are variable to provide bipolar signal balancing to the first differential amplifier stage. The emitters of $Q_1$ and $Q_2$ are commonly coupled to a negative potential through the common resistance $R_9$.

The output of the first differential amplifier stage is fed to a second differential amplifier stage consisting of PNP transistors $Q_3$ and $Q_4$. The collector of $Q_3$ is coupled to negative potential through resistances $R_{10}$ and $R_{11}$, the emitters of $Q_3$ and $Q_4$ are coupled together through resistances $R_{12}$ and $R_{13}$, while the collector of $Q_4$ is coupled to negative potential through the resistances $R_{14}$ and $R_{15}$, thus completing the loop. The emitters of $Q_3$ and $Q_4$ are commonly coupled to positive potential through the common resistance $R_{16}$.

The output from the second differential stage is fed to a pair of NPN transistors $Q_5$ and $Q_6$ which act as a rectifier. Normally, a rectifier is referenced from one output to ground. The circuit in accordance with the invention has true differential rectification, with the rectifying transistors $Q_5$ and $Q_6$ taken across the differential output of the second differential amplifier stage. This results in better stability and increased gain. The biasing of the rectifier is derived from the loop of the second differential amplifier which serves as a thresholding circuit, allowing the rectifier to produce an output signal only for signals derived from the second stage of differential amplification that are above a predetermined level. The level is fixed by the tapping position of the base electrodes of the transistors $Q_5$, $Q_6$ in the collector resistances $R_{10}$, $R_{11}$ and $R_{14}$, $R_{15}$, respectively. These collector resistances serve as potential dividers. The emitter of the transistor $Q_5$ is tied through resistor $R_{17}$ to the collector of the transistor $Q_4$, while the emitter of the transistor $Q_6$ is tied through a resistor $R_{18}$ to the collector of the transistor $Q_3$. The base of the transistor $Q_5$ is tied to the tapping point between collector divider resistances $R_{10}$ and $R_{11}$, while the base of the transistor $Q_6$ is tied to the tapping point between the collector divider resistances $R_{14}$ and $R_{15}$. The collector of $Q_5$ and $Q_6$ are connected together and through a common resistance $R_{19}$ to positive potential.

The output from the rectifier circuit is coupled to a strobe amplifier transistor $Q_7$ by means of a capacitor $C_1$. Since the strobe amplifier is not a difference amplifier, compensation for the effects of parameter variation due to life and temperature is provided by means of the capacitor $C_1$. The transistor $Q_7$ is biased conductive at quiescence via resistances $R_{20}$ and $R_{21}$, connected to positive and negative potential, respectively. Strobe pulses are applied to terminal 3 to detect the presence of sensed information, a binary "one" or "zero," through a resistance $R_{22}$ to the collector of the transistor $Q_7$, the emitter of which is connected to a reference potential or ground. The presence or absence of information is indicated at terminal 4.

In operation, a bipolar signal is applied to the input terminals 6 and 7, respectively, and from there to the respective bases of the transistors $Q_1$ and $Q_2$. Since the transistors are wired in a differential amplifier configuration, the output from each of the transistors will be representative of the difference between the input signals. The presence of information is represented ideally by a first and second pulse of equal magnitude but of opposite polarities. The transistors of the first and second differential stages are conducting in quiescence, and the pulse inputs at the inputs of both first and second stages will be amplified in the linear range. Because the second differential amplifying stage transistors are of opposite conductivity types relative to the first stage, the effect of the D.C. voltage appearing at the output of the first stage does not limit the range of D.C. voltage available to the transistors of the second stage. The second stage operates as efficiently as the first in amplifying the pulse signals over the full range. Because of this effect, further stages of succesively opposite polarity stages of differential amplification could be added without fear of distortion due to nonlinearity in transistor operation.

The loop comprising the resistances $R_{10}$, $R_{11}$, $R_{12}$, $R_{13}$, $R_{14}$, $R_{15}$ form a threshold network by virtue of proper resistance value selections in providing signals to the rectifier formed by the transistors $Q_5$–$Q_6$, both of which are nonconducting in quiescent operation. The presence of a signal exceeding the threshold level at the junction of resistance $R_{10}$, $R_{11}$ or at the junction of $R_{14}$, $R_{15}$ will cause transistor $Q_5$ or $Q_6$, respectively, to conduct, and cause a negative going pulse to be passed through the coupling capacitor $C_1$ to the base of normally conducting transistor $Q_7$, thereby rendering $Q_7$ nonconductive. When $Q_7$ is in the nonconductive state, a pulse applied at the strobe terminal 3 will be passed out the terminal 4, indicating the state of the amplifier.

The following table illustrates the particular values which may be used to implement the sense amplifier. It is to be understood that the values set forth therein are exemplary only and are in no way intended to be a limitation or restriction of the invention thereto.

| | | |
|---|---|---|
| $Q_1$, $Q_2$, $Q_5$, $Q_6$, $Q_7$ | | 2N706 |
| $Q_3$, $Q_4$ | | 2N711 |
| $R_1$, $R_2$ | ohms | 50 |
| $R_3$, $R_6$ | do | 2K |
| $R_4$, $R_5$ | do | 68 |
| $R_7$, $R_8$, to be selected. | | |
| $R_9$ | do | 1.5K |
| $R_{10}$, $R_{14}$ | do | 820 |
| $R_{11}$, $R_{15}$ | do | 180 |
| $R_{12}$, $R_{13}$ | do | 100 |
| $R_{16}$ | do | 330 |
| $R_{17}$, $R_{18}$ | do | 2.4K |
| $R_{19}$ | do | 15K |
| $R_{20}$ | do | 16K |
| $R_{21}$ | do | 100K |
| $R_{22}$ | do | 1K |
| $C_1$ | pF | 100 |

For proper compensation of temperature and life conditions, each of the paired transistors in each stage are preferably parametrically matched for optimum performance.

It is to be understood that it would be entirely within the scope of the invention to reverse the polarity types of the transistors shown and illustrated in the subject embodiment by making the appropriate polarity reversals with respect to the voltage source.

The structural features of the invention described above will allow an amplifier with the advantages of high linearity over a wide D.C. range. The absence of reactive elements in the first stages prevent any D.C. level offset or from causing any breakdown in the wide range of linearity. If saturation should occur owing to the presence of a transient noise spike or the like, the arrangement above described allows for a rapid recovery time, and linear operation is quickly regained. The amplifier proves extremely valuable in memory systems, even under conditions of extreme pattern variation in sensed information.

The above cited embodiments are intended as exemplary only, and while we have described our invention with specific embodiments and applications thereof, other modifications will be apparent to those skilled in the art without departing from the spirit and scope of the invention as defined in the appended claims.

I claim:

1. A transistorized amplification device comprising a first stage of differential amplification having first and second transistors of the same conductivity type, a second stage of differential amplification having first and second transistors of the same conductivity type but of opposite conductivity type relative to the transistors of said first stage, means connecting the differential outputs of said first stage to the respective differential inputs of said second stage, a rectifier stage having an input terminal, an output terminal and a common terminal, means connecting said input terminal and said common terminal across the differential output of said second stage, said rectifier stage being energized in response to the differential output signal of said second stage, and means connected to the output terminal of said rectifier stage for indicating the presence or absence of said signal.

2. The combination of claim 1 wherein said first stage, said second stage and said rectifier stage each comprise circuit coupling elements operating with substantially linear characteristics.

3. The combination of claim 1 wherein said last named means comprises a strobing transistor having emitter, base and collector electrodes, means commonly connecting the output electrode of said rectifier stage to the base electrode of said strobing transistor, means connecting the emitter electrode of said strobing transistor to a point of reference potential, means for applying a strobe pulse to the collector electrode of said strobing transistor, said strobing transistor being in a conductive or nonconductive state in accordance with the output of said rectifier stage, and means connected to said strobing transistor for indicating the state of said strobing transistor in response to said strobe pulse.

4. The combination of claim 1 wherein said first stage includes a first and second transistor of the NPN type, said second stage includes first and second transistors of the PNP type, and said rectifier stage includes first and second transistors of the NPN type, each of said rectifier stage transistors being responsive to the differential output signal of said second stage.

5. A transistorized low level amplification device comprising a first stage of differential amplification having first and second transistors of the same conductivity type, a second stage of differential amplification having first and second transistors of the same conductivity type but of opposite conductivity type relative to the transistors of said first stage, said second stage transistors each having emitter, base and collector electrodes, means connecting the differential outputs of said first stage to the respective bases of said second stage transistors, means for applying a first potential to the emitter electrodes of said second stage transistors, means for applying a second potential of opposite polarity to the collector electrodes of said second stage transistors, said means including a first tapped impedance means connected to the collector electrode of the first of said second stage transistors, and a second tapped impedance means connected to the collector electrode of the second of said second stage transistors, a rectifier stage comprising first and second transistors each having emitter, base and collector electrodes, means connecting the collector electrode of the first transistor in said second stage to the emitter electrode of the second transistor of said rectifier stage, means connecting collector electrode of the second transistor in said second stage to the emitter electrode of the first transistor of said rectifier stage, means connecting the base electrode of the first transistor of said rectifier stage to the tapping position on said first tapped impedance means, means connecting the base electrode of the second transistor of said rectifier stage to the tapping position on said second tapped impedance means, means commonly connecting the collector electrodes of the first and second transistors of said rectifier stage, means applying said first potential to said rectifier stage transistors, said rectifier transistors each being in a quiescently cut off state, one of said rectifier transistors further being rendered conductive by the presence of a difference signal exceeding cutoff potential of said transistors as determined by said first and second tapped impedance means, and means connected to the collector electrodes of said rectifier stage transistors for indicating the presence or absence of said signal.

6. The combination of claim 5 wherein said first and second tapped impedance means are of equal value and each are tapped in the same relative position.

7. The combination of claim 5 wherein said first stage, said second stage and said rectifier stage each comprise circuit coupling elements operating with substantially linear characteristics.

8. The combination of claim 5 wherein said last named means comprises a strobing transistor having emitter, base and collector electrodes, means commonly connecting the collector electrodes of said rectifier stage transistors to the base electrode of said strobing transistor, means connecting the emitter electrode of said strobing transistor to a point of reference potential, means for applying a strobe pulse to the collector electrode of said strobing transistor, said strobing transistor being in a conductive or nonconductive state in accordance with the state of said rectifier stage transistor, and means connected to said strobing transistor for indicating the said state thereof, in response to said strobe pulse.

9. The combination of claim 5 wherein said first stage includes a first and second transistor of the NPN type, said second stage includes first and second transistors of the PNP type, and said rectifier stage includes first and second transistors of the NPN type.

10. A transistorized amplification device comprising a stage of differential amplification having first and second inputs applied thereto and having a differential output supplied therefrom, said stage including first and second transistors and a plurality of impedance devices forming, together with said first and second transistors a first, second, third, fourth potential point, said first and second points having therebetween the differential output signal of said stage, said third and fourth points also having therebetween the differential output signal of said stage, a rectifier stage comprising first and second transistors each having input, output and common electrodes, means coupling the input and common electrodes of the first of said rectifier stage transistors to said first and second points respectively, means coupling the input and common electrodes of the second of said rectifier stages to said third and fourth points respectively, and means connected to the output electrodes of both of said rectifier stage transistors for indicating the presence or absence of said differential output signal.

11. A transistorized amplification device comprising a stage of differential amplification having first and second inputs applied thereto and having a differential output signal supplied therefrom, a rectifier stage having an input terminal, an output terminal and a common terminal, means connecting said input terminal and said common terminal across the differential output of said stage, said rectifier stage having a cutoff level and being energized in response to a differential output signal from said stage of differential amplification having a magnitude in excess of said cutoff level, and means coupled to said output terminal of said rectifier stage for deriving an output signal therefrom.

References Cited

UNITED STATES PATENTS

| | | | |
|---|---|---|---|
| 2,995,664 | 8/1961 | Deuitch | 307—239 |
| 3,168,708 | 2/1965 | Williams et al. | 330—30 |
| 3,328,599 | 6/1967 | Stupar | 330—30 |

ARTHUR GAUSS, *Primary Examiner.*

B. P. DAVIS, *Assistant Examiner.*

U.S. Cl. X.R.

307—237; 330—30